(12) United States Patent
Chung et al.

(10) Patent No.: US 9,408,098 B2
(45) Date of Patent: Aug. 2, 2016

(54) METHOD AND DEVICE FOR PROCESSING CHANNEL QUALITY INFORMATION IN COMMUNICATION SYSTEM

(75) Inventors: Seok Ho Chung, Seoul (KR); Young Seok Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 732 days.

(21) Appl. No.: 12/856,935

(22) Filed: Aug. 16, 2010

(65) Prior Publication Data

US 2011/0051611 A1   Mar. 3, 2011

(30) Foreign Application Priority Data

Aug. 27, 2009   (KR) .................... 10-2009-0079587

(51) Int. Cl.
*H04W 24/10* (2009.01)
*H04L 12/26* (2006.01)

(52) U.S. Cl.
CPC ............. *H04W 24/10* (2013.01); *H04L 43/022* (2013.01)

(58) Field of Classification Search
CPC ...... H04L 43/02; H04L 43/022; H04L 43/024
USPC .................. 370/252, 253, 328–338
See application file for complete search history.

(56) References Cited

U.S. PATENT DOCUMENTS

| 6,810,019 | B2 * | 10/2004 | Steudle ..................... 370/252 |
| 2008/0153506 | A1 * | 6/2008 | Yin et al. .................. 455/452.2 |
| 2009/0196250 | A1 * | 8/2009 | Feng et al. ................... 370/330 |
| 2010/0222008 | A1 * | 9/2010 | Astely et al. .............. 455/67.11 |

FOREIGN PATENT DOCUMENTS

| KR | 10-2004-0048563 A | 6/2004 |
| KR | 10-2009-0063057 A | 6/2009 |
| WO | 2009-008787 A1 | 1/2009 |

* cited by examiner

*Primary Examiner* — Pao Sinkantarakorn
(74) *Attorney, Agent, or Firm* — Jefferson IP Law, LLP

(57) ABSTRACT

A method and device for processing channel quality information in a communication system is provided. A preset sampling range is determined to estimate a channel quality of a sub-frame in a quality measurement mode. The sampling rate is calculated based on the interval between samples in the channels of the sampling range. The samples are detected in the channels according to the sampling rate. The channel quality information is measured in the samples. A receiving apparatus can maintain the cannels for measuring the channel quality information, i.e., the number of samples, in a certain range. The receiving apparatus can reduce the number of samples, thereby reducing the time required for measuring the channel quality information by a preset measurement time interval. The receiving apparatus can increase the number of samples, thereby raising the accuracy of the channel quality information.

12 Claims, 7 Drawing Sheets

METHOD AND DEVICE FOR PROCESSING CHANNEL QUALITY INFORMATION IN COMMUNICATION SYSTEM

PRIORITY

This application claims the benefit under 35 U.S.C. §119 (a) of a Korean patent application filed on Aug. 27, 2009 in the Korean Intellectual Property Office and assigned Serial No. 10-2009-0079587, the entire disclosure of which is hereby incorporated by reference.

BACKGROUND OF THE INVENTION

1. Field of the Invention

The present invention relates to communication systems. More particularly, the present invention relates to a method and device that processes channel quality information in a communication system.

2. Description of the Related Art

In general, transmitters and receivers, included in communication systems, make the frequency efficiency of the channel higher through Adaptive Modulation and Coding (AMC). According to the channel quality between a transmitter and a receiver, the transmitter schedules to allocate a channel to the receiver, thereby increasing the throughout of the communication system. To this end, the receiver estimates the channel quality information and feeds it backs to the transmitter.

Recently, communication systems have raised the frequency efficiency of the channels via a Multiple Input Multiple Output (MIMO) scheme. The receiver adapted to the MIMO scheme includes a plurality of reception antennas and at least one transmission antenna. When the receiver receives channel data via the plurality of reception antennas, it needs to estimate channel quality information by the respective reception antennas.

Currently, communication systems have also been designed to elevate the frequency efficiency of the channels using a codebook. The codebook contains a plurality of codes. The transmitter pre-codes at least part of the codes and transmits channel data. When the receiver receives channel data via the plurality of codes, it estimates the channel quality information by the respective codes.

However, when conventional communication systems receive channel data, the receiver needs to consider the large number of reception antennas or the large number of codes, and thus has difficulty estimating the channel quality information. For example, if the receiver estimates, in parallel, the channel quality information by the respective reception antenna or the respective codes, it needs to enlarge corresponding elements. In addition, if the receiver serially estimates the channel quality information by the respective reception antennas or the respective codes, it requires a relatively large amount of time to perform corresponding processes. When the receiver is set to reduce the estimation time for the channel quality information, the accuracy of the channel quality information is lowered.

SUMMARY OF THE INVENTION

An aspect of the present invention is to address the above-mentioned problems and/or disadvantages and to provide at least the advantages described below. Accordingly, an aspect of the present invention is to provide a method for processing channel quality information in a communication system.

The present invention further provides a device for processing channel quality information in a communication system.

In accordance with an aspect of the present invention, a method for processing channel quality information in a communication system is provided. The method includes determining a preset sampling range to estimate a channel quality of a sub-frame in a quality measurement mode, extracting samples via channels in the sampling range, and measuring the channel quality information in the samples.

In an exemplary implementation, the extracting of the samples includes calculating a sampling rate based on the interval between the samples via channels in the sample range, and detecting the samples in the channels according to the sampling rate.

In accordance with another aspect of the present invention, a device for processing channel quality information in a communication system is provided. The device includes a range determiner for determining a preset sampling range to estimate a channel quality of a sub-frame in a quality measurement mode, a channel sampler for extracting samples via channels in the sampling range, and a quality measurer for measuring the channel quality information in the samples.

In an exemplary implementation, the device may further include a rate calculator for calculating a sampling rate based on the interval between the samples via channels in the sample range.

In an exemplary implementation, the channel sampler detects the samples in the channels according to the sampling rate.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term 'channel quality information' refers to information regarding the quality of communication channels between a transmitting apparatus and a receiving apparatus in a communication system. The channel quality information may include a Channel Quality Indicator (CQI), a Pre-coding Matrix Indicator (PMI), and a Rank Indicator (RI).

Figure 1:
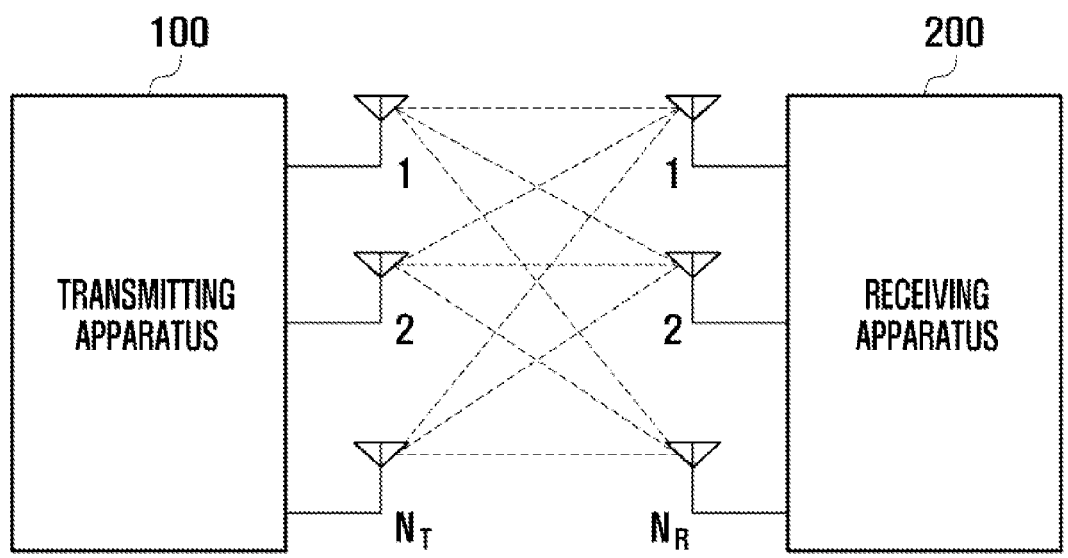
FIG. 1 shows a schematic block diagram illustrating a communication system according to an exemplary embodiment of the present invention.

FIG. 1 shows a schematic block diagram illustrating a communication system according to an exemplary embodiment of the present invention.

Referring to FIG. 1, the communication system includes a transmitting apparatus 100 and a receiving apparatus 200. The transmitting apparatus 100 includes a plurality of transmission antennas, for example, $N_T$ transmission antennas, where $N_T$ is a positive integer. The receiving apparatus 200 includes at least one reception antennas, for example, $N_R$ reception antennas, where $N_R$ is a positive integer. The transmitting apparatus 100 transmits channel data in frames via the transmission antennas. The receiving apparatus 200 receives the channel data in frames via the reception antennas. The receiving apparatus 200 estimates channel quality information by the respective reception antennas and feeds it back to the transmitting apparatus 100. The transmitting apparatus 100 controls the channel states, via a Modulation-Coding Scheme (MSC), using the channel quality information. This increases the throughput of the communication system. In an exemplary implementation of the present invention, the transmitting apparatus 100 may be a base station. The receiving apparatus 200 may be a communication terminal.

Figure 2:
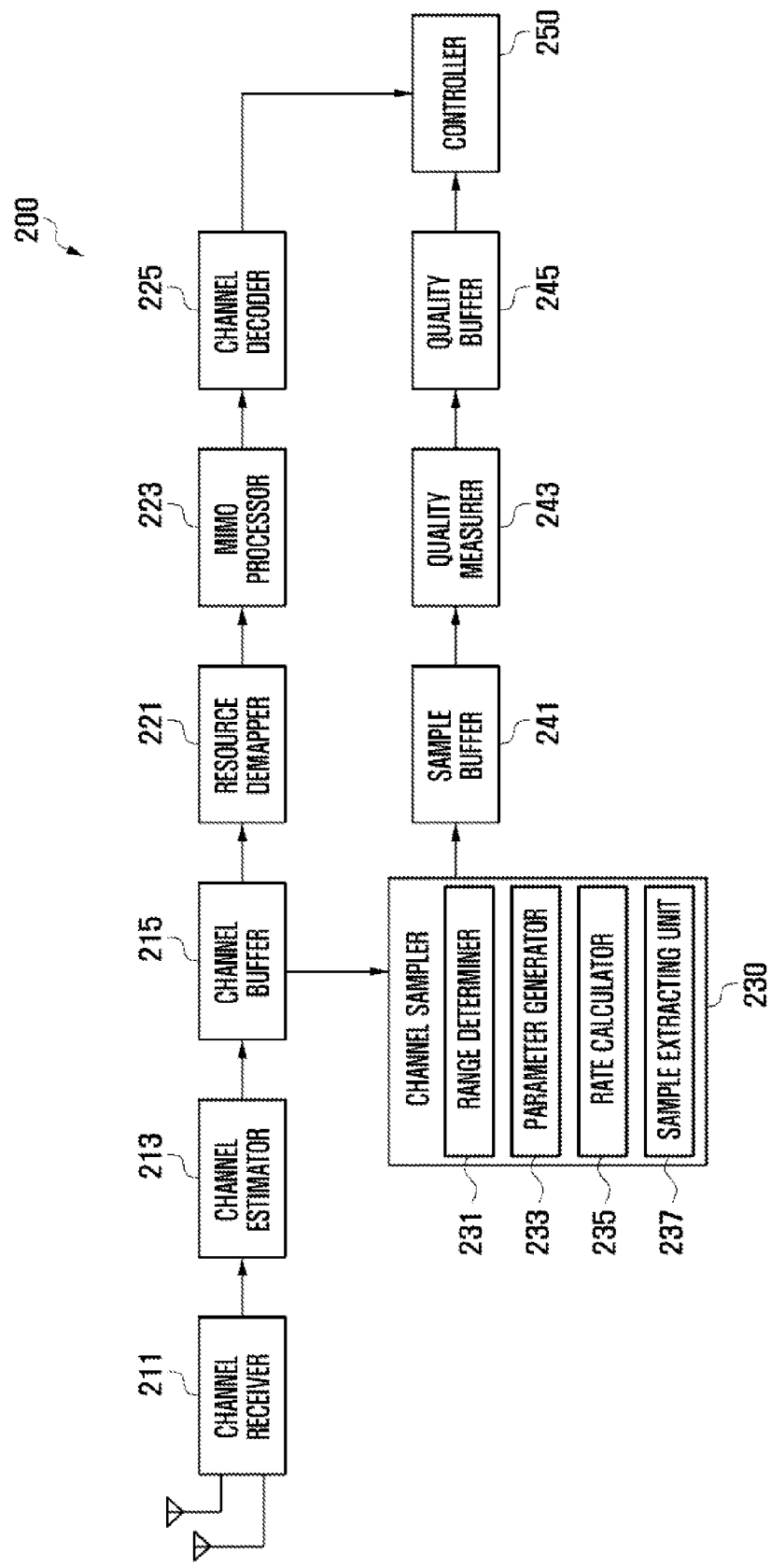
FIG. 2 shows a schematic block diagram illustrating a channel quality information processing device of a receiving apparatus according to an exemplary embodiment of the present invention.

The receiving apparatus 200 includes a channel quality information processing device in order to estimate the channel quality information and feed it back to the transmitting apparatus 100, which is explained in greater detail referring to FIG. 2.

FIG. 2 shows a schematic block diagram illustrating a channel quality information processing device of a receiving apparatus according to an exemplary embodiment of the present invention. It is assumed that an exemplary embodiment of the communication system according to the present invention employs an Orthogonal Frequency Division Multiplexing (OFDM) scheme; however, it should be understood that the present invention is not limited to the exemplary embodiment.

Referring to FIG. 2, a receiving apparatus 200 includes a channel receiver 211, a channel estimator 213, a channel buffer 215, a resource demapper 221, a MIMO processor 223, a channel decoder 225, a channel sampler 230, a sample buffer 241, a quality measurer 243, a quality buffer 245, and a controller 250. The resource demapper 221, the MIMO processor 223 and the channel decoder 225 form a configuration to process channel data in a data processing mode. The channel sampler 230, the sample buffer 241, the quality measurer 243 and the quality buffer 245 are forming a configuration to estimate channel quality information in a quality measurement mode.

The channel receiver 211 receives channel data via at least one reception antenna. The channel receiver 211 performs Fast Fourier Transform (FFT). The channel receiver 211 receives channel data in sub-frames. A sub-frame includes a plurality of resource blocks.

The channel estimator 213 estimates channels via the sub-frames. The channel estimate 213 can estimate channels using a reference signal in the sub-frame.

The channel buffer 215 stores channel data under the control of the channel estimator 213.

The resource demapper 221 demaps the channel data that is output from the channel buffer 215.

The MIMO processor 223 processes data, in MIMO scheme. That is, the MIMO processor 223 processes data, by considering the affect among the reception antennas.

The channel decoder 225 decodes and restores data. The channel decoder 225 generates Log-Likelihood Ratio (LLR) using channels and data and performs a rate de-matching operation. The channel decoder 225 detects errors from data via the Forward Error Correction (FFC) and the (Cyclic Redundancy Check (CRC). If the channel decoder 225 does not detect an error, it can decode the data.

The channel sampler 230 extracts samples from channel data output from the channel buffer 215. The channel sampler 230 includes a range determiner 231, a parameter generator 233, a rate calculator 235, and a sample extracting unit 237. The range determiner 231 determines a sampling range in the sub-frame. The sampling range contains at least one resource block in the sub-frame. The sampling range may be a default sampling range preset by the service providers or an additional sampling range additionally set by a command from a user of the receiving apparatus 200. The parameter generator 233 generates a sampling parameter according to the determined sampling range. The sampling parameter contains the number of channels, a measurement time interval, the number of samples, the frequency of measurement repetition, a measurement latency, a control margin, etc. The rate calculator 235 calculates a sampling rate using the sampling parameter. The sampling rate refers to intervals between samples in the channel data in the sampling range. The sample extracting unit 237 detects samples from channel data in the sampling range, according to the sampling rate.

The sample buffer 241 stores the samples under the control of the channel sampler 230. The quality measurer 243 measures channel quality information in the samples. The quality measurer 243 measures in all the samples within a preset measurement time interval. The quality measurer 243 serially measures channel quality information by the respective reception antennas. The quality buffer 245 stores channel quality information under the control of the quality measurer 234.

The controller 250 controls overall operations of the receiving apparatus 200. That is, the controller 250 stores channel data in the memory or retrieves the channel data. The controller 250 allows the receiving apparatus 200 to report the channel quality information to the transmitting apparatus 100. The controller 250 generates feedback information based on the channel quality information and transmits it to the transmitting apparatus 100.

The receiving apparatus 200 estimates the channel quality information from the channel data and feeds it back to the transmitting apparatus 100 by performing a channel quality information processing method. This is explained in greater detail with reference to FIG. 3, FIGS. 4 to 6, and FIGS. 7A to 7F.

Figure 3:
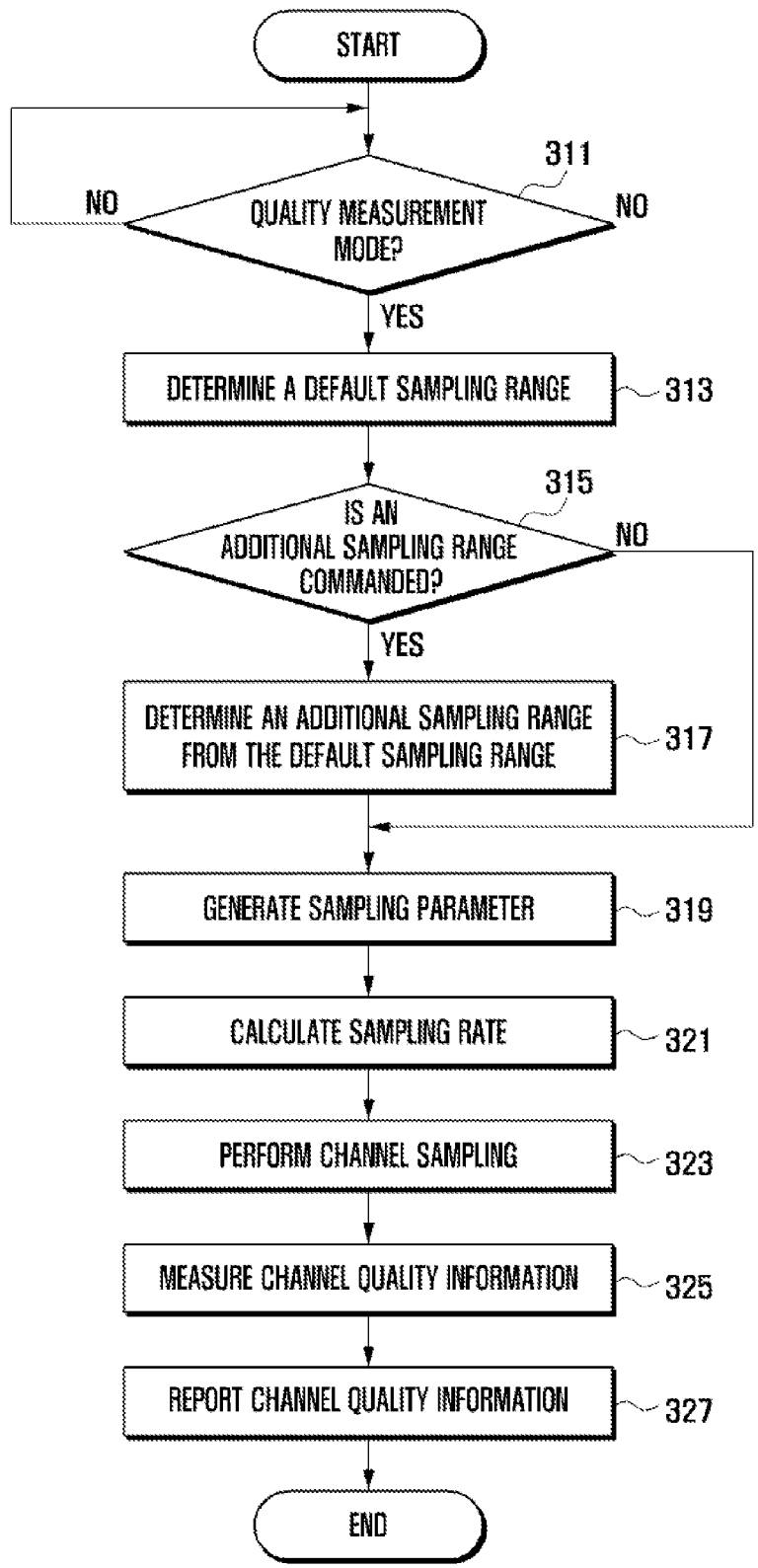
FIG. 3 shows a flowchart that describes a channel quality information processing method of a receiving apparatus according to an exemplary embodiment of the present invention.

FIG. 3 shows a flowchart that describes a channel quality information processing method of a receiving apparatus according to an exemplary embodiment of the present invention. FIG. 3, FIGS. 4 to 6, and FIGS. 7A to 7F are views that describe the channel quality information processing method of FIG. 3. It is assumed that an exemplary embodiment of the communication system according to the present invention employs an Orthogonal Frequency Division Multiplexing (OFDM) scheme. It should be, however, understood that the present invention is not limited to the exemplary embodiment.

Referring to FIG. 3, the receiving apparatus 200 determines whether it is operated in a quality measurement mode at step 311. When the transmitting apparatus 100 detects a measurement request, the receiving apparatus 200 can enter the quality measurement mode. Alternatively, if a preset measurement period has elapsed, the receiving apparatus 200 can enter a quality measurement mode.

Figure 4:
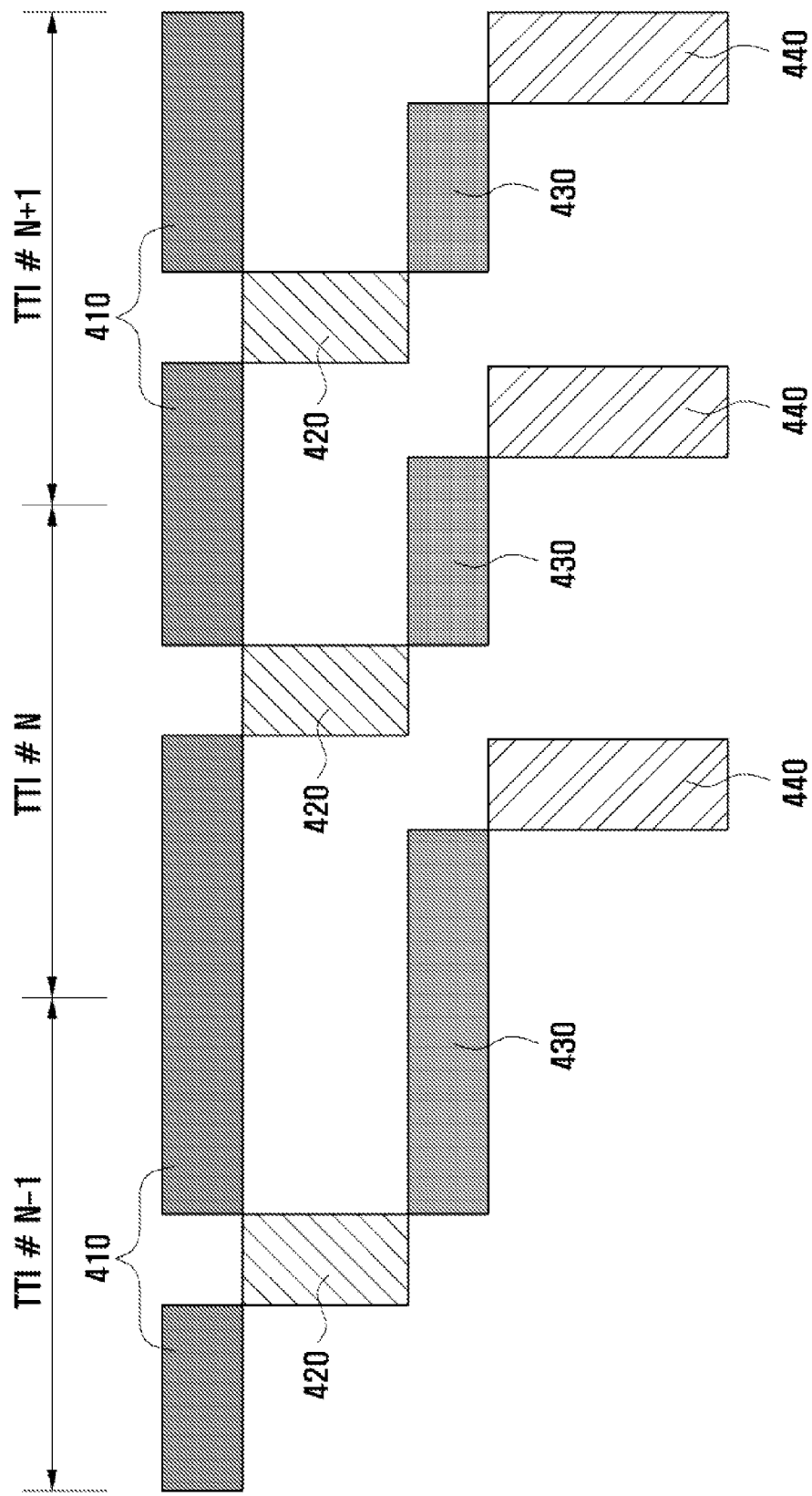
FIGS. 4 and 5 show a transmission time interval that describes a channel quality information processing method according to an exemplary embodiment of the present invention.

In that case, as shown in FIG. 4, the receiving apparatus 200 is operated for the Transmission Time Intervals (TTIs), i.e., TTI #N−1, TTI #N, and TTI #N+1. The receiving apparatus 200 processes data in a data processing mode for the data processing section 410. During the data processing mode, the receiving apparatus 200 may also be operated in a quality measurement mode for the quality measurement section (420, 430, and 440). The quality measurement section (420, 430, and 440) includes a sampling region 420, a measurement region 430, and a report region 440. That is, when the receiving apparatus 200 is operated in the quality measurement mode, it stops operating in the data processing mode. The receiving apparatus 200 can resume the data processing mode immediately after the sampling region 420. That is, the data processing section 410 may overlap the measurement region 430 and the report region 440, which indicates that the receiving apparatus 200 can be simultaneously operated in the data processing mode and the quality measurement mode for the overlapping portions.

Figure 5:
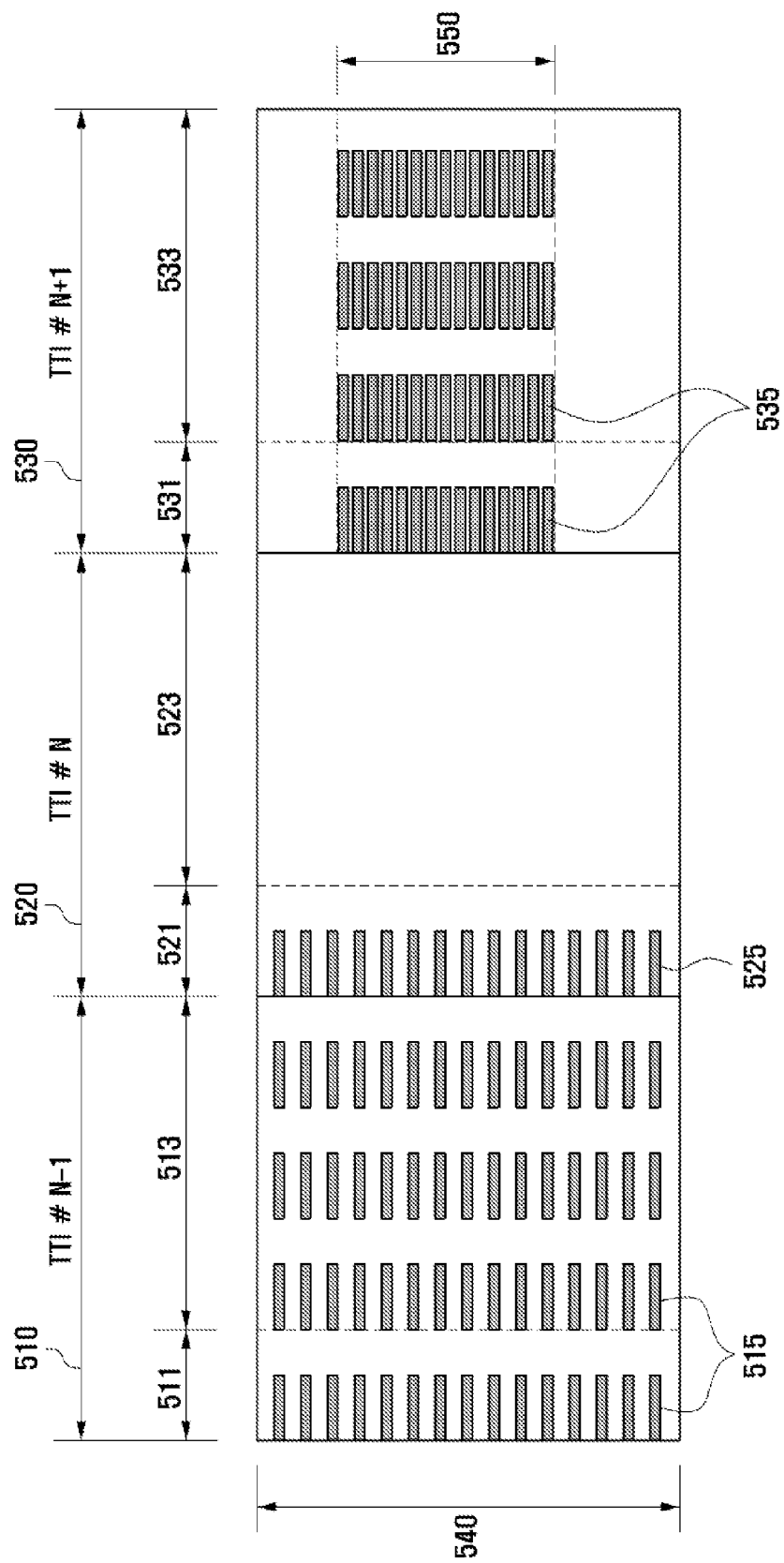

At step 313, when the receiving apparatus 200 enters the sampling region 420, it determines a default sampling range 540 in the sub-frame 510, 520, or 530, as shown in FIG. 5. Each of the sub-frames 510, 520 and 530 is transmitted with a certain bandwidth for a transmission time interval. The default sampling range 540 includes at least one resource block (not shown) in the sub-frame 510, 520, or 530. Alternatively, the default sampling range 540 may include the same number of resource blocks as the sub-frame 510, 520, or 530. That is, the default sampling range 540 may include the entire resource blocks in the sub-frame 510, 520, or 530.

The receiving apparatus 200 analyzes a higher signaling layer and determines whether a command for an additional sampling range 550 exists at step 315. If the receiving apparatus 200 ascertains that a command for an additional sampling range 550 exists at step 315, it determines the additional sampling range 550 in the sub-frame 510, 520, or 530 at step 317. The additional sampling range 550 includes at least one resource block in the sub-frame 510, 520, or 530. The additional sampling range 550 may include the resource blocks, of which the number is identical to or different from that of the default sampling range 540.

The receiving apparatus 200 generates a sampling parameter in the additional sampling range 550 at step 319. Meanwhile, the receiving apparatus 200 can also generate a sampling parameter in the default sampling range 540 if a command for an additional sampling range 550 does not exist at step 315. The sampling parameter contains the number of channels, a measurement time interval, the number of samples, the frequency of measurement repetition, a measurement latency, a control margin, etc.

The receiving apparatus 200 can detect the number of symbols, the number of sub-carriers, etc., from the sub-frame 510, 520 or 530 and estimates the number of channels, according to the Cyclic Prefix (CP) structure, type, bandwidth, and transmission time interval of the sub-frame 510, 520 or 530. For example, according to the type of the sub-frame 510, 520 or 530, the receiving apparatus 200 may estimate the number of channels from a normal sub-frame (510 or 530, for example) or a multi-cell Multicast Broadcast Signal Frequency Network (MBSFN) sub-frame (520, for example). Regarding the normal sub-frame 510 or 530, the receiving apparatus 200 can detect the number of channels from a control region 511 or 531 and a data region 513 or 533. Regarding the MBSFN sub-frame 520, the receiving apparatus 200 can detect the number of channels from a control region 521 instead of a data region 523. In addition, if a command for the additional sampling range 550 does not exist, the receiving apparatus 200 detects the number of channels from a default sampling range 540. Otherwise, if a command for an additional sampling range 550 exists, the receiving apparatus 200 detects the number of channels from the additional sampling range 550 of the normal sub-frame 530.

The receiving apparatus 200 can set the measurement time interval according to the size of the measurement region 430. The receiving apparatus 200 can set the frequency of measurement repetition, according to the number of reception antennas or the MIMO scheme. The receiving apparatus 200 can also set the measurement latency and the control margin, according to its performance. Furthermore, the receiving apparatus 200 divides a preset measurement time interval according to the preset number of measurement repetitions, the measurement latency, and the control margin, and estimates the number of samples that can be measured, corresponding to the divided measurement time intervals.

After that, the receiving apparatus 200 calculates a sampling rate using the sampling parameter at step 321. The sampling rate refers to a sampling interval. That is, the receiving apparatus 200 calculates the sampling rate, according to the number of channels and the rate between samples, in the default sampling range 540 or the additional sampling range 550. The sampling parameter is needed to meet the sampling conditions described as the following equation 1. The receiving apparatus 200 can calculate the sampling rate, described as the following equation 2.

$$N_{sample} = R_{sampling} \times (N_{symbol} \times N_{re}) \quad (1)$$
$$T_{lim} > (N_{sample} + T_{latency} + T_{margin}) \times N_{cal}$$

-continued $$R_{sampling} = \text{floor}\left(\frac{T_{lim}/N_{cal} - T_{latency} - T_{margin}}{N_{symbol} \times N_{re}}\right) \quad (2)$$

$N_{channel}$ denotes the number of channels, $R_{samping}$ denotes the sampling rate, $N_{symbol}$ denotes the number of symbols, $N_{re}$ denotes the number of sub-carriers, $T_{latency}$ denotes measurement latency, $T_{margin}$ denotes a control margin, $N_{cal}$ denotes the number of measurement repetitions, and $T_{lim}$ denotes the measurement time interval. The floor function refers to a decimal truncation function to truncate decimals.

The receiving apparatus 200 performs a channel sampling according to the sampling rate and extracts a sample 515, 525, or 535 at step 323. That is, the receiving apparatus 200 detects the sample 515, 525, or 535 in the default sampling range 540 or the additional sampling range 550. For example, if the sampling rate is one, the receiving apparatus 200 detects all channels as the sample 515, 525, or 535. If the sampling rate is two, the receiving apparatus 200 detects one of the two channels as the sample 515, 525, or 535.

Figure 6:
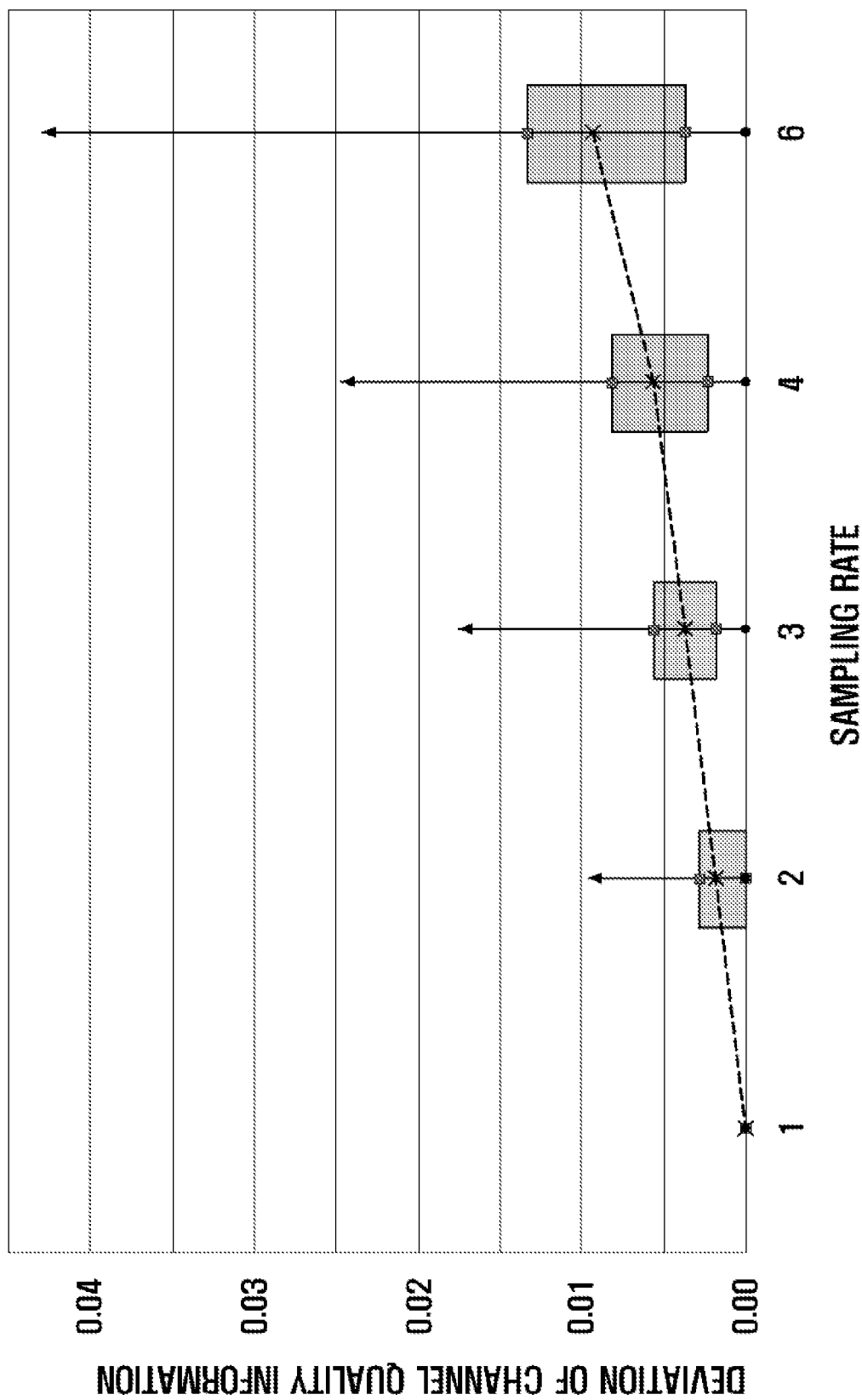
FIG. 6 is a graph of the deviation of channel quality information with respect to a sampling rate according to an exemplary embodiment of the present invention.

After that, the receiving apparatus 200 measures the channel quality information regarding the sample 515, 525, or 535 at step 325. Although the receiving apparatus 200 repeats the measurement process in 2,000 frames, the deviation of channel quality information according to the sampling rate is relatively small as shown in the graph of FIG. 6. Therefore, the receiving apparatus 200 can measure the channel quality information, by keeping a certain degree of accuracy.

Next, as shown in FIGS. 7A to 7F, a receiving apparatus 200 can serially measure the channel quality information by the respective reception antennas in a measurement region 710 corresponding to the measurement region 430 as shown in FIG. 4. The receiving apparatus 200 measures the channel quality information, by considering a preset frequency of measurement repetition, according to the number of reception antennas or the MIMO scheme.

After that, the receiving apparatus 200 reports the channel quality information to the transmitting apparatus 100 at step 327. The receiving apparatus 200 generates feedback information based on the channel quality information in the report region 440 and then transmits it to the transmitting apparatus 100.

Although the exemplary embodiment is implemented in such a way that the receiving apparatus 200 serially measures the channel quality information by the respective reception antennas, it should be understood that the present invention is not limited to the exemplary embodiment. For example, the receiving apparatus 200 can serially measure the channel quality information by the codes. In that case, the receiving apparatus 200 measures the channel quality information, by considering the preset frequency of measurement repetitions, according to the number of reception antennas or the MIMO scheme.

Figure 7:
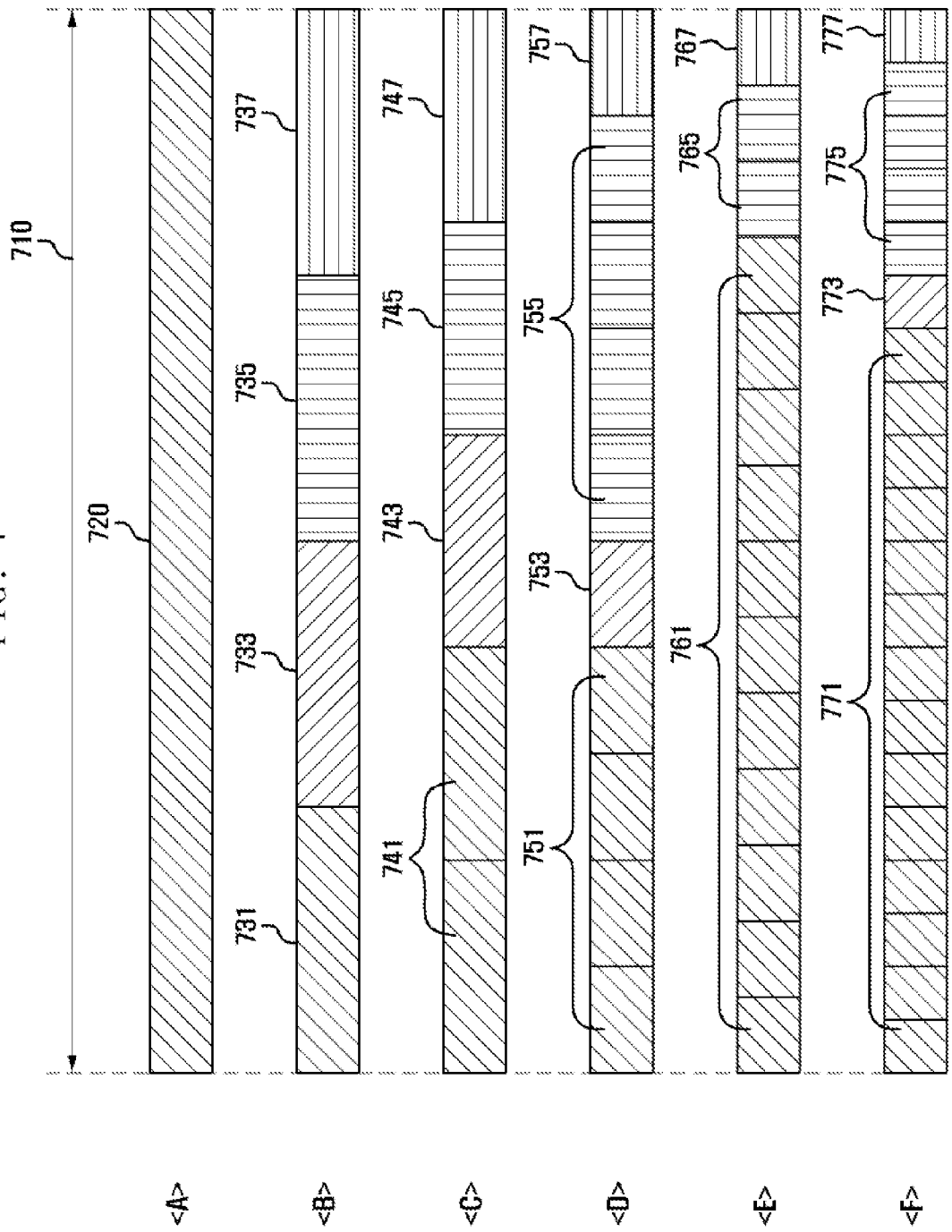
FIGS. 7A to 7F shows transmission time intervals according to the number of reception antennas according to an exemplary embodiment of the present invention.

For example, if the receiving apparatus 200 includes a single reception antenna, it can measure channel quality information regarding the single reception antenna via the sample 515, 525 or 535 in the single division region 720 corresponding to the measurement region 710, as shown in FIG. 7A.

If the transmitting apparatus 100 employs a 2 Tx open loop scheme using two transmission antennas, the receiving apparatus 200 divides the measurement region 710 into four divisional regions 731, 733, 735, and 737, as shown in FIG. 7B. In that case, the receiving apparatus 200 measures the channel quality information in the first divisional region 731. If the transmitting apparatus 100 employs a 2 Tx closed loop scheme using two transmission antennas, the receiving apparatus 200 divides the measurement region 710 into five divisional regions 741, 743, 745, and 747, as shown in FIG. 7C. In that case, the receiving apparatus 200 measures the channel quality information in first and second divisional regions 741.

If the transmitting apparatus 100 employs a 4 Tx open loop scheme using four transmission antennas, the receiving apparatus 200 divides the measurement region 710 into 10 divisional regions, i.e., four 751s, one 753, four 755s, and one 757, as shown in FIG. 7D. In that case, the receiving apparatus 200 measures the channel quality information in the first to fourth divisional regions 751. Likewise, if the transmitting apparatus 100 employs a 4 Tx closed loop scheme using four transmission antennas and is set to use pre-determined codes, the receiving apparatus 200 divides the measurement region 710 into 14 divisional regions, i.e., eleven 761s, two 765s, and one 767, as shown in FIG. 7E. In that case, the receiving apparatus 200 measures the channel quality information in the $1^{st}$ to $11^{th}$ divisional regions 761. On the other hand, if the transmitting apparatus 100 employs a 4 Tx closed loop scheme using four transmission antennas and does not have a limitation to use codes, the receiving apparatus 200 divides the measurement region 710 into 20 divisional regions, i.e., fourteen 771s, one 773, four 775s and one 777, as shown in FIG. 7F. In that case, the receiving apparatus 200 measures the channel quality information in the $1^{st}$ to $14^{th}$ divisional regions 771.

Although the exemplary embodiment is implemented in such a way that the receiving apparatus determines the default sampling range and then an additional sampling range in the default sampling range, according to the command for the additional sampling range, it should be understood that the present invention is not limited to the exemplary embodiment. For example, the exemplary embodiment can be modified in such a way to previously store the additional sampling ranges in the receiving apparatus. That is, the receiving apparatus determines the default sampling range and then a corresponding stored additional sampling range in the default sampling range.

As described above, the method and device for processing channel quality information in a communication system, according to exemplary embodiments of the present invention, determines the number of samples considering the measurement time interval, so that the channels to measure the channel quality information, i.e., the number of samples, can be maintained within a certain range. Therefore, if the number of samples is reduced, the receiving apparatus can also reduce the time required for measuring the channel quality information by a preset measurement time interval. In addition, if the number of samples is increased, the receiving apparatus can raise the accuracy of the channel quality information. Since the receiving apparatus determines the number of samples based on the measurement time interval, although it serially measures the channel quality information by the respective reception antennas or the respective codes, its efficiency can be raised by the measurement time interval. That is, the receiving apparatus can efficiently measure the channel quality information.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for processing channel quality information in a communication system, the method comprising:

determining a preset sampling range to estimate a channel quality of a subframe in a quality measurement mode;

generating a sampling parameter based on the preset sampling range, the sampling parameter including at least a number of channels, and a number of samples;

extracting samples via channels in the preset sampling range using the sampling parameter; and measuring the channel quality information in the samples, wherein the number of channels is determined by a type of subframe, and wherein a number of channels of a first type subframe is determined by a number of detected channels in a whole region of the first type subframe, and the number of channels of a second type subframe is determined by a number of detected channels in a partial region of the second type subframe.

2. The method of claim 1, wherein the extracting of the samples comprises:

calculating a sampling rate based on an interval between the samples via the channels in the preset sampling range using the sampling parameter; and detecting the samples in the channels in the preset sampling range according to the sampling rate.

3. The method of claim 2, wherein the measuring of the channel quality information comprises:

measuring the channel quality information during a preset measurement time interval.

4. The method of claim 2, wherein the calculating of the sampling rate uses the following equation:

$$R_{sampling} = \text{floor}\left(\frac{T_{lim}/N_{cal} - T_{latency} - T_{margin}}{N_{symbol} \times N_{re}}\right)$$

wherein, $R_{samping}$ denotes the sampling rate, $N_{symbol}$ denotes a number of symbols, $N_{re}$ denotes a number of sub-carriers, $T_{latency}$ denotes a measurement latency, $T_{margin}$ denotes a control margin, $N_{cal}$ denotes a number of measurement repetitions, and $T_{lim}$ denotes a measurement time interval.

5. The method of claim 1, wherein the determining of the preset sampling range comprises:

determining a default sampling range previously set in the subframe; and determining, if an additional sampling range has been set in a higher signaling layer, the additional sampling range in the subframe.

6. The method of claim 1, further comprising:

reporting the channel quality information regarding the channels in the preset sampling range to a transmitting apparatus.

7. A device for processing channel quality information in a communication system, the device comprising:

a range determiner for determining a preset sampling range to estimate a channel quality of a subframe in a quality measurement mode;

a parameter generator for generating a sampling parameter based on the preset sampling range, the sampling parameter including at least a number of channels, and a number of samples;

a channel sampler for extracting samples via channels in the preset sampling range using the sample parameter; and a quality measurer for measuring the channel quality information in the samples, wherein the number of channels is determined by a type of subframe, and wherein a number of channels of a first type subframe is determined by a number of detected channels in a whole region of the first type subframe, and the number of channels of a second type subframe is determined by a number of detected channels in a partial region of the second type subframe.

8. The device of claim 7, further comprising:

a rate calculator for calculating a sampling rate based on an interval between the samples via the channels in the preset sampling range using the sampling parameter, wherein the channel sampler detects the samples in the channels in the preset sampling range according to the sampling rate.

9. The device of claim 8, wherein the quality measurer measures the channel quality information during a preset measurement time interval.

10. The device of claim 8, wherein the rate calculator calculates the sampling rate using the following equation:

$$R_{sampling} = \text{floor}\left(\frac{T_{lim}/N_{cal} - T_{latency} - T_{margin}}{N_{symbol} \times N_{re}}\right)$$

wherein $R_{samping}$ denotes the sampling rate, $N_{symbol}$ denotes a number of symbols, $N_{re}$ denotes a number of sub-carriers, $T_{latency}$ denotes a measurement latency, $T_{margin}$ denotes a control margin, $N_{cal}$ denotes a number of measurement repetitions, and $T_{lim}$ denotes a measurement time interval.

11. The device of claim 7, wherein the range determiner determines a default sampling range previously set in the subframe, and, if an additional sampling range has been set in a higher signaling layer, the additional sampling range in the subframe.

12. The device of claim 7, further comprising:

a controller for reporting the channel quality information regarding the channels in the preset sampling range to a transmitting apparatus.

* * * * *